(12) United States Patent
Lu et al.

(10) Patent No.: US 11,023,650 B2
(45) Date of Patent: Jun. 1, 2021

(54) APPARATUS AND METHOD FOR CIRCUIT TIMING FIXING USING EXTENSION METAL SECTIONS AND ALTERNATE VIAS

(71) Applicant: Samsung Electronics Co., Ltd., Suwon-si (KR)

(72) Inventors: Hongda Lu, Austin, TX (US); Kok-Hoong Chiu, Austin, TX (US); Vaibhav Sharma, Austin, TX (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/663,332

(22) Filed: Oct. 24, 2019

(65) Prior Publication Data

US 2020/0401668 A1 Dec. 24, 2020

Related U.S. Application Data

(60) Provisional application No. 62/863,243, filed on Jun. 18, 2019.

(51) Int. Cl.
| | | |
|---|---|---|
| *G06F 30/398* | (2020.01) | |
| *G06F 30/3312* | (2020.01) | |
| *G06F 119/12* | (2020.01) | |
| *G06F 119/18* | (2020.01) | |
| *G06F 30/337* | (2020.01) | |
| *G06F 30/367* | (2020.01) | |
| *G06F 30/39* | (2020.01) | |

(52) U.S. Cl.
CPC ........ *G06F 30/398* (2020.01); *G06F 30/3312* (2020.01); *G06F 30/337* (2020.01); *G06F 30/367* (2020.01); *G06F 30/39* (2020.01); *G06F 2119/12* (2020.01); *G06F 2119/18* (2020.01)

(58) Field of Classification Search
CPC ............. G06F 30/3312; G06F 2119/12; G06F 2119/18; G06F 30/398; G06F 30/30; G06F 30/392; G06F 30/39; G06F 2111/04; G06F 30/33; G06F 30/337; G06F 30/367
See application file for complete search history.

(56) References Cited

U.S. PATENT DOCUMENTS

| | | | | |
|---|---|---|---|---|
| 5,452,239 A | * | 9/1995 | Dai ......................... | G06F 30/34 703/19 |
| 5,801,958 A | * | 9/1998 | Dangelo ........ | G01R 31/318357 716/102 |

(Continued)

*Primary Examiner* — Helen Rossoshek
(74) *Attorney, Agent, or Firm* — Renaissance IP Law Group LLP

(57) ABSTRACT

A timing fixing logic section may select a timing path from among a plurality of timing paths. For the selected timing path, multiple nets along the path may be traversed. For a particular net, multiple metal layers may be traversed. For a particular metal layer, multiple shapes that are associated with the particular net may be traversed. A timing fixing logic section may examine space that is nearby each of the shapes, and identify unused space. The timing fixing logic section may add an extension metal section to the shape. In addition, the timing fixing logic section may identify an existing via of a first type, and select an alternate via of a second type having a resistance that is higher or lower than the existing via. The existing via may be replaced with the alternate via. Accordingly, hold and setup timing of a circuit may be improved.

13 Claims, 8 Drawing Sheets

(56) References Cited

U.S. PATENT DOCUMENTS

| | | | | |
|---|---|---|---|---|
| 6,470,468 B1* | 10/2002 | Fukui | ............ | G01R 31/318328 714/741 |
| 6,701,289 B1* | 3/2004 | Garnett | ................. | G06F 30/39 703/14 |
| 6,836,877 B1* | 12/2004 | Dupenloup | ............. | G06F 30/30 716/103 |
| 7,243,315 B2* | 7/2007 | Tan | ......................... | G06F 30/39 716/113 |
| 7,409,659 B2* | 8/2008 | Chakraborty | ......... | G06F 30/327 716/122 |
| 7,752,588 B2* | 7/2010 | Bose | ..................... | G06F 30/392 716/122 |
| 7,886,248 B2* | 2/2011 | Hi rota | ................... | G06F 30/39 716/130 |
| 7,913,213 B2* | 3/2011 | Smith | ............... | G06F 30/3312 716/113 |
| 7,921,393 B2* | 4/2011 | Furnish | ................ | G06F 30/392 716/110 |
| 8,332,793 B2* | 12/2012 | Bose | ....................... | G06F 30/39 716/114 |
| 8,397,196 B2* | 3/2013 | Tetelbaum | ............. | G06F 30/39 716/113 |
| 8,479,141 B1* | 7/2013 | Waller | .................. | G06F 30/394 716/126 |
| 8,677,306 B1* | 3/2014 | Andreev | ............... | G06F 11/267 716/136 |
| 8,751,996 B1* | 6/2014 | Birch | .................... | G06F 30/394 716/129 |
| 8,832,608 B1* | 9/2014 | Chakrabarty | ......... | G06F 30/327 716/51 |
| 8,839,173 B1 | 9/2014 | Jiang et al. | | |
| 8,875,082 B1* | 10/2014 | Sircar | ..................... | G06F 30/39 716/134 |
| 8,966,425 B1* | 2/2015 | Eisenstadt | ............. | G06F 30/394 716/120 |
| 9,083,325 B2 | 7/2015 | Datta et al. | | |
| 9,136,153 B2* | 9/2015 | Or-Bach | ........... | H01L 21/76254 |
| 10,289,774 B1* | 5/2019 | Yadav | ................ | G06F 30/3312 |
| 10,783,292 B1* | 9/2020 | Clewes | ................ | G06F 30/392 |
| 2014/0105246 A1* | 4/2014 | Andreev | ............... | G06F 1/206 374/178 |
| 2017/0352617 A1 | 12/2017 | Kuesel | | |
| 2018/0278253 A1 | 9/2018 | Lu et al. | | |
| 2020/0311221 A1* | 10/2020 | Reddy | ..................... | G06F 30/39 |

* cited by examiner

APPARATUS AND METHOD FOR CIRCUIT TIMING FIXING USING EXTENSION METAL SECTIONS AND ALTERNATE VIAS

BACKGROUND

The present inventive concepts relate to semiconductor circuits, and more particularly, to an apparatus and method for circuit hold timing and setup timing fixing using extension metal sections and alternate vias.

A significant concern in integrated circuit design involves efforts to meet hold and setup times without timing violations. Violations of hold and setup times may cause incorrect data to be latched. These may result in hold or setup violations. Hold time is the minimum amount of time after a clock's active edge during which data must be stable. Setup time is the minimum amount of time before the clock's active edge that the data must be stable for it to be latched correctly. Traditional hold and setup timing fix approaches involve the addition and legalization of newly added cells, which requires routing the nets connected to those new cells, all of which results in perturbation to the design. Cell displacement and route perturbation may cause new timing and physical design rule check (DRC) violations especially at congested areas within the circuit design. Consequently, extra engineering change order (ECO) loops must be added for fixing the timing and DRC violations.

BRIEF SUMMARY

Embodiments disclosed herein include a method for circuit timing fixing using extension metal sections and alternate vias. The method may include receiving, by an input logic section, a timing violation report. The method may include selecting, by a timing fixing logic section, a timing path from among a plurality of timing paths. The method may include, for the selected timing path, traversing each of a plurality of nets along the path. The method may include, for a particular net from among the plurality of nets, traversing each of a plurality of metal layers. The method may include, for a particular metal layer from among the plurality of metal layers, traversing each of a plurality of shapes that are associated with the particular net. The method may include examining, by a timing fixing logic section, space that is nearby each of the plurality of shapes. The method may include identifying, by the timing fixing logic section, unused space within the examined space. The method may include adding, by the timing fixing logic section, an extension metal section to at least one of the shapes from among the plurality of shapes. The method may include identifying, by the timing fixing logic section, an existing via of a first type from among a plurality of vias associated with the examined space. The method may include selecting, by the timing fixing logic section, an alternate via of a second type having a resistance that is higher than the existing via. The method may include replacing the existing via with the alternate via.

Embodiments disclosed herein include a non-transitory machine-readable medium comprising instructions executable by one or more processors, the instructions comprising instructions to receive, by an input logic section, a timing violation report. The instructions may comprise instructions to select, by a design rules checking logic section, a timing path from among a plurality of timing paths. The instructions may comprise instructions to, for the selected timing path, traverse each of a plurality of nets along the path. The instructions may comprise instructions to, for a particular net from among the plurality of nets, traverse each of a plurality of metal layers. The instructions may comprise instructions to, for a particular metal layer from among the plurality of metal layers, traverse each of a plurality of shapes that are associated with the particular net. The instructions may comprise instructions to examine, by a timing fixing logic section, space that is nearby each of the plurality of shapes. The instructions may comprise instructions to identify, by the timing fixing logic section, unused space within the examined space. The instructions may comprise instructions to add, by the timing fixing logic section, an extension metal section to at least one of the shapes from among the plurality of shapes.

The instructions may comprise instructions to identify, by the timing fixing logic section, an existing via of a first type from among a plurality of vias associated with the examined space. The instructions may comprise instructions to select, by the timing fixing logic section, an alternate via of a second type having a resistance that is higher than the existing via. The instructions may comprise instructions to replace the existing via with the alternate via.

BRIEF DESCRIPTION OF THE DRAWINGS

The foregoing and additional features and advantages of the present inventive principles will become more readily apparent from the following detailed description, made with reference to the accompanying figures, in which.

DETAILED DESCRIPTION

Figure 1:
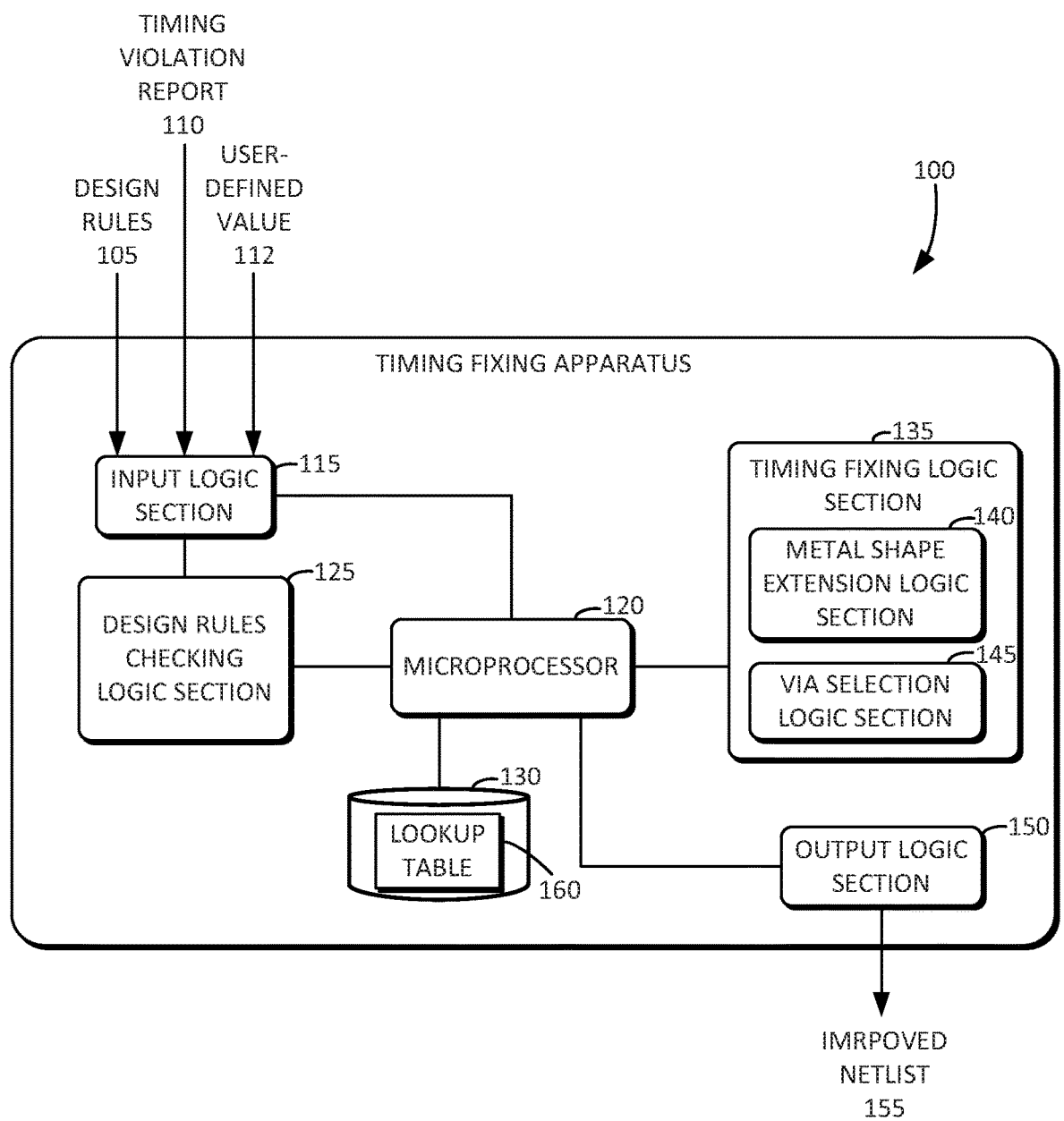
FIG. 1 is an example diagram of a block diagram of a timing fixing apparatus in accordance with some embodiments.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first extension metal section could be termed a second extension metal section, and, similarly, a second extension metal section could be termed a first extension metal section, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments disclosed herein provide an apparatus and method for parsing through one or more timing violation reports and identifying potential candidates for hold and/or setup timing fixing. In some embodiments, a threshold limit such as −5 picoseconds (ps) may be set for the paths as candidates to be used for hold and/or setup timing fixing. Each path may be used to traverse the circuit layout to identify physical nets along the path, and look for opportunities to add extra extension metal sections and/or provide alternate vias without introducing new routing violations.

In some embodiments, adding extension metal sections and/or alternate vias may result in extra capacitance and resistance, which may slow down the net, which in turn would be beneficial for hold fixing. This technique requires no new delay cells, which would otherwise add to area and potentially cause congestion in very dense regions of the design, and also increase the static IR drop (i.e., voltage drop when a constant current draws through the network with varying resistance) and instantaneous voltage drop (IVD) violations in critical hotspots. Rather than adding new delay cells, the embodiments disclosed herein need not increase overall power as no new cells are added. More importantly, design closure time is quicker since there are less perturbations and iterations needed to the design. Effectively, this results in a faster hold and/or setup timing fix approach and overall reduces the timing ECO iterations.

Some embodiments disclosed herein use metal capacitance and via resistance to increase or decrease the resistive-capacitive (RC) delay of the wire. This results in fewer design ECO iterations that may be required. Another benefit is an improvement in area and power usage. Furthermore, embodiments described herein cause few if any layout perturbations. No single cell and existing routing shape need be touched. Any suitable number of extension metal sections and/or alternate vias may be added in identified areas without causing new physical DRC. The disclosed technique has almost no timing impact on the other paths in the design.

It makes the hold and/or setup timing fix very predictable. The number of nets identified for adding extension metal sections and/or swapping one type of via for another type of via with a higher resistance can be controlled in a search algorithm to further improve hold and/or setup timing through one or more user defined variables. Furthermore, the technique disclosed herein uses less power compared with traditional methods, which depend on the addition of extra cells. Moreover, the technique disclosed herein further reduces the number of ECO timing closure iterations.

Some embodiments herein parse though a static timing analysis (STA) timing report such as an STA hold timing report. In the case of an STA hold timing report, for example, all of the hold timing violation paths smaller than −5 ps may be selected as candidates. The number of nets on a hold timing path can be controlled through a user defined variable. This effectively controls the amount of ps hold timing to add to the path, and can allow for bigger hold margin if desired. For each of the hold violation paths, the technique involves performing hold fixing on the nets that are traversed. Similar techniques may be used for setup violation paths, typically done at the capture path of a clock network of the timing path.

FIG. 1 is an example diagram of a block diagram of a timing fixing apparatus 100 in accordance with some embodiments. The timing fixing apparatus 100 may include a microprocessor 120, a storage device 130 such as a volatile or non-volatile memory or hard drive, an input logic section 115, and an output logic section 150. Further, the timing fixing apparatus 100 may include a design rules checking logic section 125 and a timing fixing logic section 135. The timing fixing logic section 135 may include a metal shape extension logic section 140 and a via selection logic section 145. The input logic section 115 may receive design rules 105 and a timing violation report 110. The microprocessor 120 and/or the design rules checking logic section 125 may process the design rules 105 and/or the timing violation report 110. The storage device 130 may store the design rules 105, the timing violation report 110, and/or an improved netlist 155 with timing fixes incorporated.

The timing fixing logic section 135 may fix and/or improve timing violations using the design rules 105 and/or the timing violation report 110. For example, the metal shape extension logic section 140 of the timing fixing logic section 135 may identify unused space in which one or more extension metal sections may be added to existing shapes that are associated with a particular net, as further described in detail below. By way of another example, the via selection logic section 145 may identify an existing via of a first type, and replace the existing via with an alternate via of a second type having a resistance that is higher than the via of the first type, as also explained in further detail below. The output logic section 150 may output an improved netlist 155.

The timing fixing apparatus 100 may receive a user-defined value 112 representing a number of nets to be traversed. In some embodiments, the user-defined value 112 is a timing slack threshold. In some embodiments, the user-defined value 112 controls extension of space. The timing fixing apparatus 100 may limit the number of nets to be traversed to the user-defined value. The timing fixing logic section 135 may track a number of extension metal sections that are added, and a number of vias that are replaced. When at least one of the number of extension metal sections or the number of vias exceeds a predefined threshold, the fixing may be completed, and the timing fixing apparatus 100 may output the improved netlist 155. The storage device 130 may store a lookup table 160, as further described below.

Figure 2:
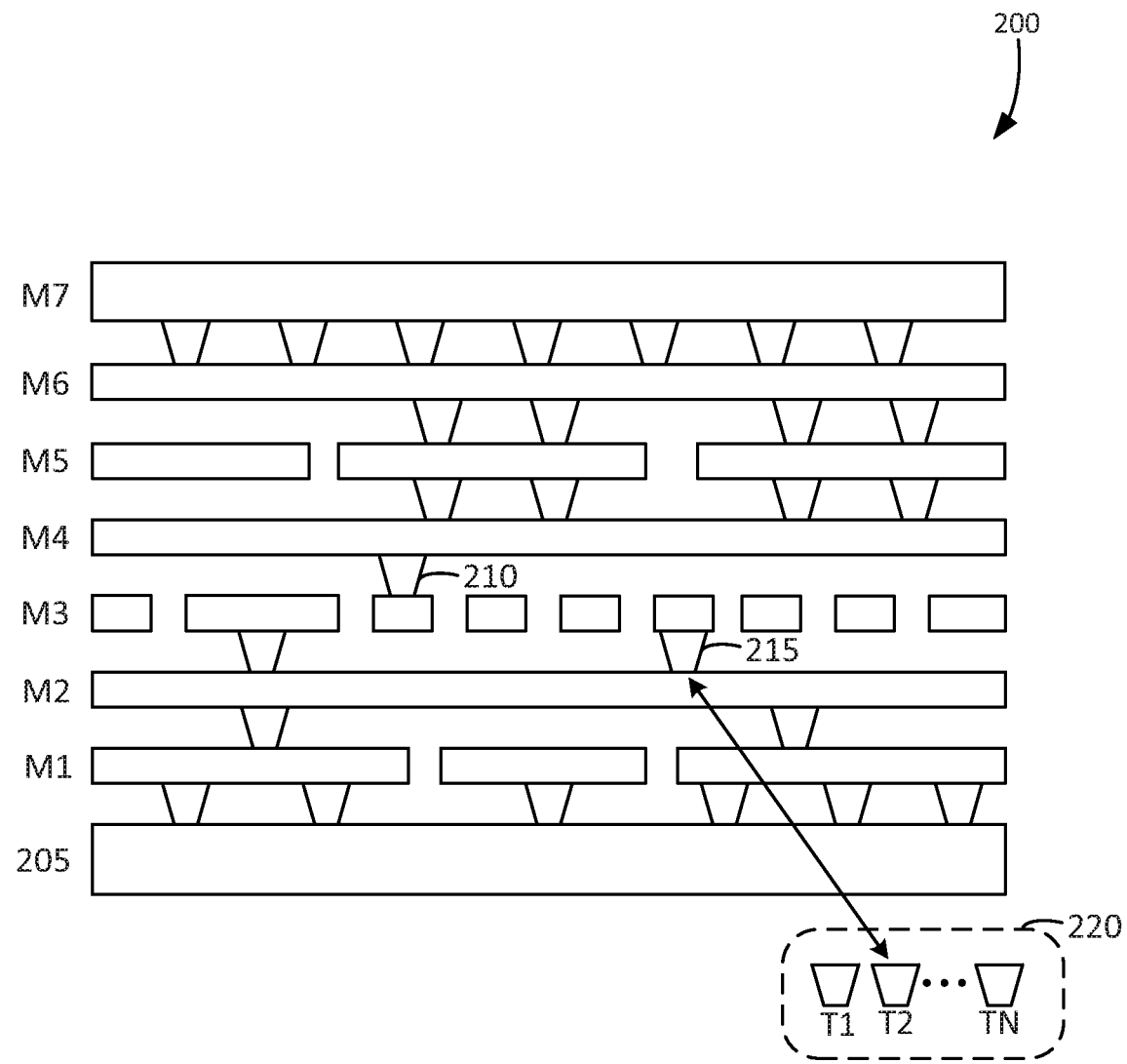
FIG. 2 is an example cross sectional diagram showing different metal layers in a circuit in accordance with some embodiments.

FIG. 2 is an example cross sectional diagram showing different metal layers (e.g., M1 through M7) in an example circuit 200 in accordance with some embodiments. The circuit 200 may include a substrate 205. The circuit 200 may include multiple metal layers, such as metal layers M1 through M7. The circuit timing fixing technique disclosed herein may evaluate the lower metal layers first, and then work up to the higher metal layers, as further described below. This approach is advantageous because lower metal layers generally have a higher resistance, and therefore, fewer extension metal sections are needed to achieve the desired timing fix result. If the fixing of timing on one metal layer is insufficient, then the next metal layer up can be evaluated and fixed, and so forth. The circuit 200 may include multiple vias such as via 210 and via 215. Each of the vias may be of a particular type having a particular resistance or capacitance associated therewith. The vias may be swapped for an alternate via having a different type (e.g., T1, T2, through TN as shown in the legend 220). Accordingly, timing fixes can be achieved by changing the electrical characteristics of one or more vias in the circuit 200. The combination of both extension metal sections and alternate vias provide fine tune fixing to the timing characteristics of the circuit 200.

Figure 3:
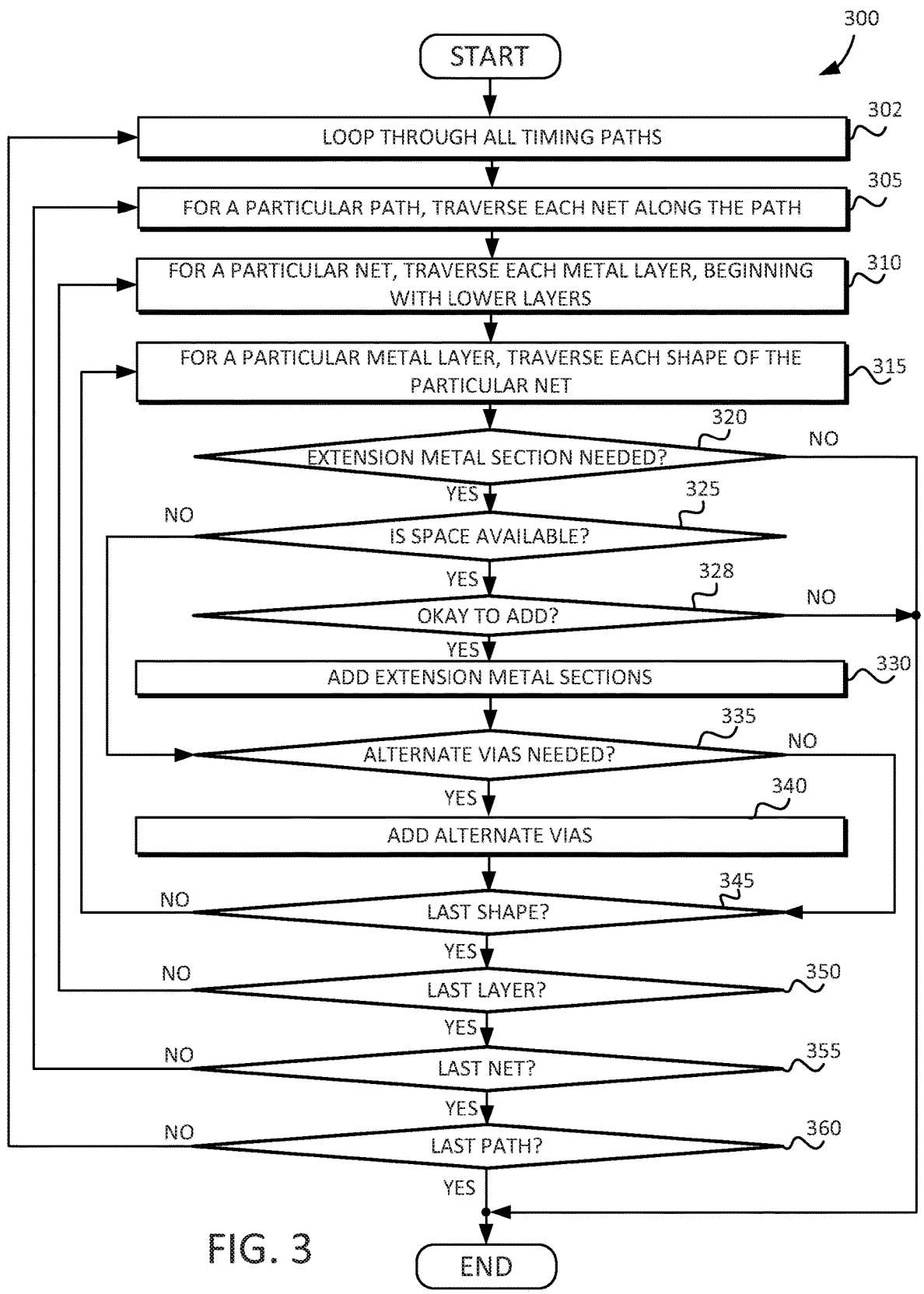
FIG. 3 is a flow diagram illustrating a technique for circuit timing fixing using extension metal sections and alternate vias in accordance with some embodiments.

FIG. 3 is a flow diagram 300 illustrating a technique for circuit timing fixing using extension metal sections and alternate vias in accordance with some embodiments. At 302, all timing paths associated with a timing violation report (e.g., 110 of FIG. 1) are looped through, with each of the timing paths being selected one at a time, dependent on a timing slack threshold which may be a user defined value shown in FIG. 1. For example, the timing fixing logic section (e.g., 135 of FIG. 1) may select a timing path from among multiple timing paths. At 305, for a particular selected timing path, each net along the path may be traversed. For example, the timing fixing logic section (e.g., 135 of FIG. 1) may process, inspect, and/or fix each of multiple nets along each selected timing path. The number of nets to traverse can be controlled or tuned using the user-defined value (e.g., 112 of FIG. 1). Those nets to be fixed of a timing path traversed may be prioritized where the driver of the net is of a weaker drive strength relative to the capacitive load it is driving. Adding the extension metal sections or swapping the vias to ones of a higher resistance help to slow down the path, which may be beneficial for hold and setup depending on whether it is a data or cloth path, respectively.

At 310, for a particular net, each metal layer may be traversed, beginning with a lower metal layer and ending with a higher metal layer. For example, the timing fixing logic section (e.g., 135 of FIG. 1) may process, inspect, and/or fix each of multiple metal layers, beginning with M2, then M3, and continuing through M7, for example. At 315, for a particular metal layer, each shape of the particular net may be traversed. For example, the timing fixing logic section (e.g., 135 of FIG. 1) may process, inspect, and/or fix each of multiple shapes of the particular metal layer of the particular net. More specifically, a determination may be made at 320 whether one or more extension metal sections are needed. If YES, then a determination can be made at 325 whether space near the shape is available or otherwise unused. In some embodiments, the extension of space is controlled by a user defined value 112 (of FIG. 1). Otherwise, if NO at 320, the flow can skip to END. The timing fixing logic section (e.g., 135 of FIG. 1) may examine space that is nearby each of the shapes, and identify unused space within the examined space. When it is determined that space is available at 325, then another determination may be made at 328 whether it is okay to extend metal sections. In other words, timing slack of neighboring nets where the space is available may be checked where there can be timing perturbation of critical neighboring nets due to capacitive coupling if metal extensions are added. These "critical" neighboring nets may be tagged at step 310 above, which may then be fed into step 320 such that no metal extensions are added if so desired by the user. This feature can be controlled using the user defined value 112 (of FIG. 1). When it is determined that it is okay to extend the metal sections at 328, then one or more extension metal sections may be added to the shape at 330, thereby extending the original metal shape. Conversely, when it is determined that space is not available at 325, then the flow can skip to 335. In addition, at 330, the design rules checking logic section 125 may check that the added one or more extension metal sections do not introduce new DRC violations.

At 335, a determination may be made whether one or more alternate vias are needed. For example, one type of via may be swapped for another type of via having a higher or lower resistance, which can alter the timing characteristics of the circuit. At 340, an alternate via may be added. For example, the timing fixing logic section (e.g., 135 of FIG. 1) may identify an existing via of a first type, and select an alternate via of a second type having a resistance that is either higher or lower than the existing via. The timing fixing logic section may then replace the existing via with the alternate via. In addition, at 340, the design rules checking logic section 125 may check that the alternate via does not introduce new DRC violations. When an alternate via is not needed at 335, then the flow can skip directly to 345. An alternate via may be needed when any added extension metal sections are insufficient to fix a timing issue.

The number of extension metal sections may be tracked. Similarly, the number of swapped vias may be tracked. If the number of extension metal sections exceeds a predefined threshold, or if the number of swapped vias exceeds a predefined threshold, then the flow can break out of the loop and jump directly to END, and the hold violation path is considered fixed and verified through timing. Accordingly, different metal layers are visited, with the nearby space of the net shape being examined, which can be used for adding metal and/or vias without causing any physical DRC.

When the last shape of a particular metal layer of a particular net is visited at 345, the flow moves on to the next metal layer. When the last metal layer is visited at 350, the flow moves on to the next net of the timing violation path. When the last net of the timing violation path is visited at 355, then the flow moves on to 360. In other words, when all the nets of the particular path are visited, the timing fixing for the particular path is completed without completely fixing the violation—if the flow completely fixes the violation, then the flow breaks out of the loops and jumps directly to END. At 360, a determination is made whether the last path has been visited. If so, then the technique ends. Otherwise, the technique loops back to 302 for further processing.

It will be understood that the steps illustrated in FIG. 3 need not be performed in the order as shown. For example, some steps may be performed before other steps, or visa versa. In addition, intervening steps that are not shown in FIG. 3 may be performed, without departing from the inventive aspects disclosed herein.

Reference is now made to FIGS. 1 through 3. The timing fixing apparatus 100 may improve hold timing of a circuit dependent on the extension metal sections added and/or the alternate vias swapped, typically on the capture path of a clock network of the timing path. Moreover, the timing fixing apparatus 100 may improve setup timing of a circuit dependent on the extension metal sections and/or the alternate vias.

The timing fixing logic section 135 may perform a lookup operation in the lookup table 160. The lookup table 160 may include resistance information associated with each of the metal layers. The lookup table 160 may include capacitance information associated with each of the metal layers. The lookup table may include resistance information associated with each of the vias. The lookup table may include driver sizes information. The metal shape extension logic section 140 may perform a lookup operation in the lookup table 160 to guide addition of the extension metal sections. The metal shape extension logic section 140 may perform a lookup operation in the lookup table 160 to guide the number of extension metal sections that are added. The via selection logic section 145 may perform a lookup operation in the lookup table to guide the number of vias that are replaced.

Figure 4:
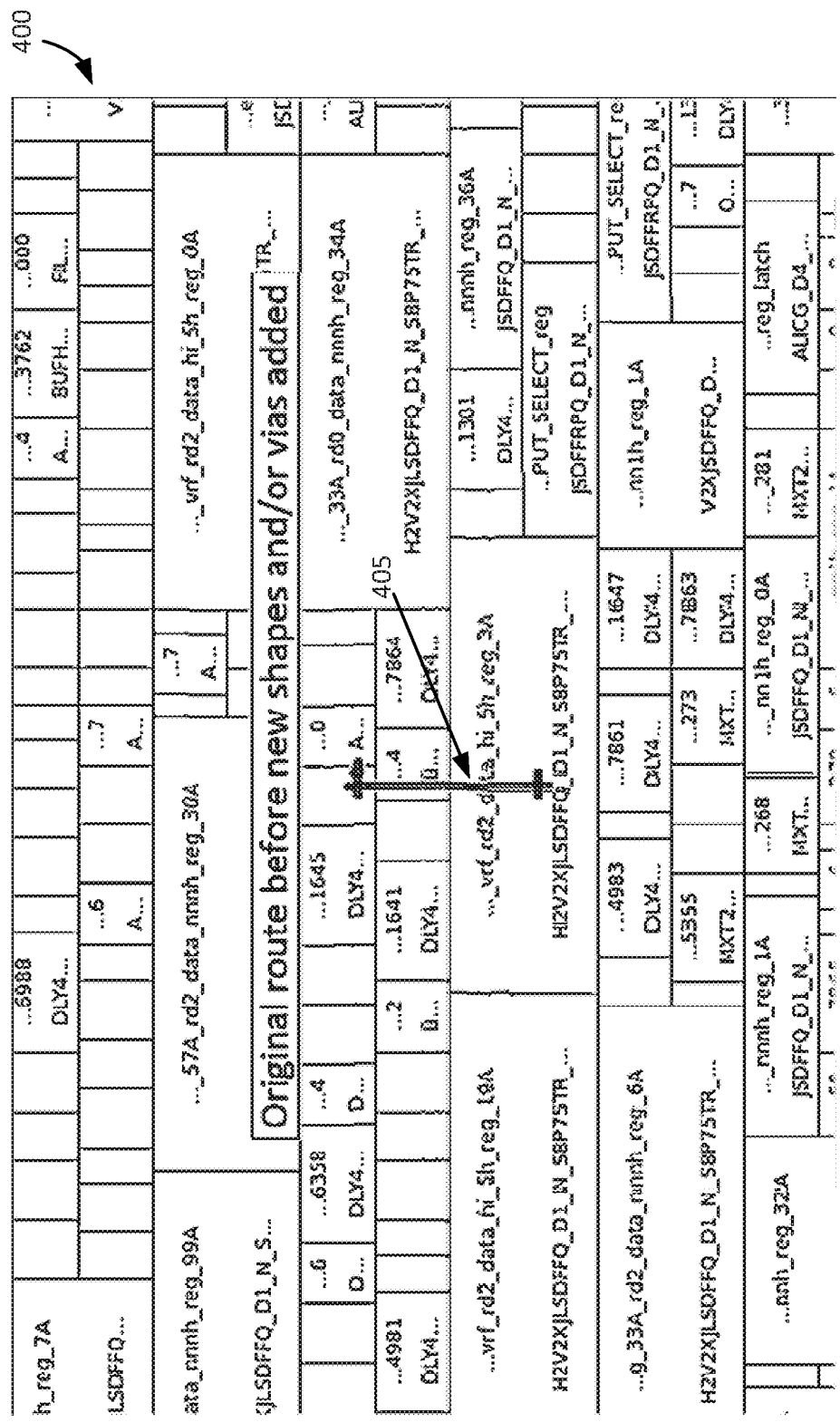
FIG. 4 is an example diagram of a plan view of a section of a circuit layout including an original route before new extension metal sections and alternate vias are added.

FIG. 4 is an example diagram 400 of a plan view of a section of a circuit layout including a section 405 of an original route before new extension metal sections and alternate vias are added.

Figure 5:
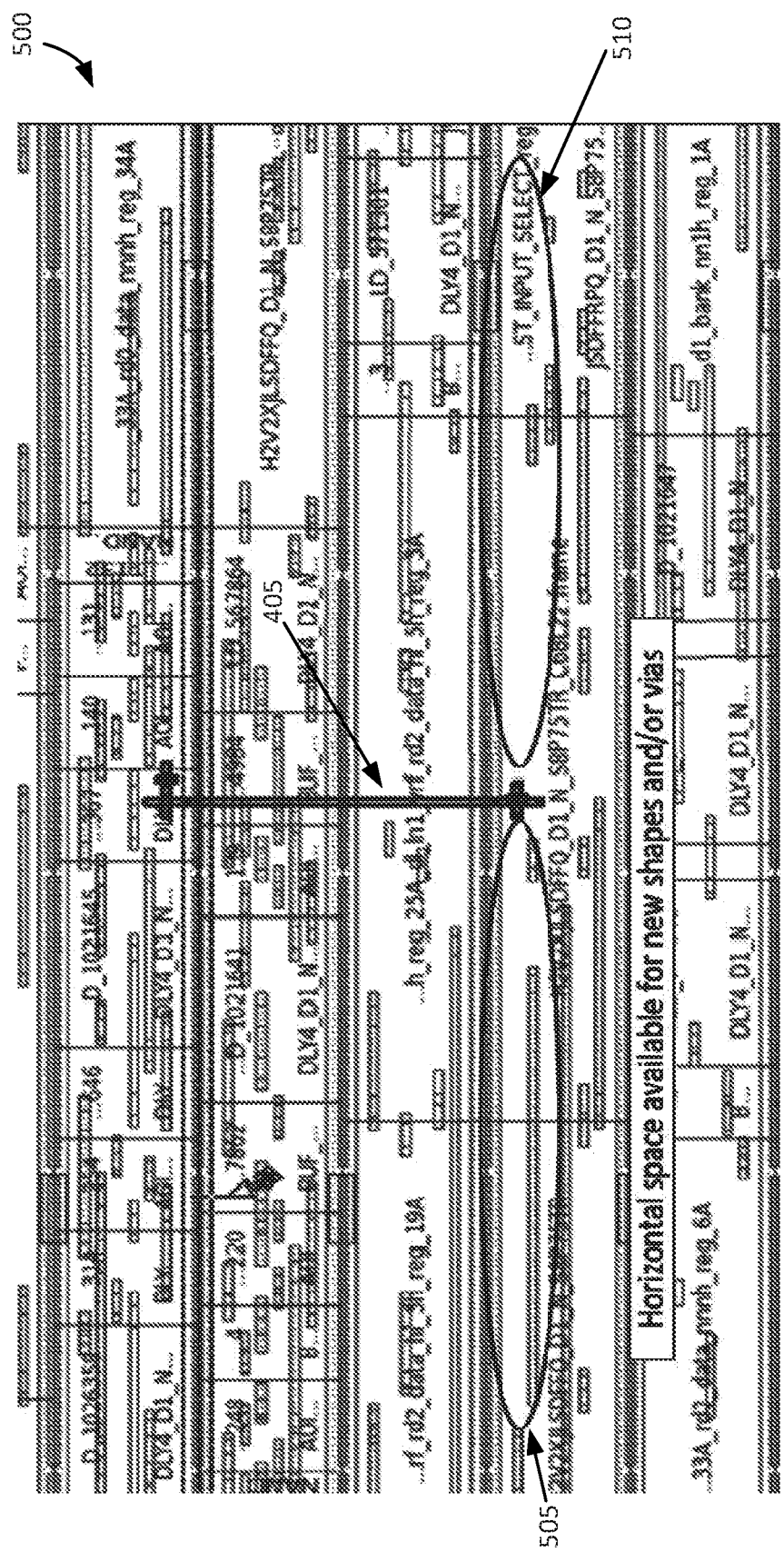
FIG. 5 is an example diagram of a plan view of a section of a circuit layout including the original route and unused horizontal space that is available for new extension metal sections and/or alternate vias to be added.

FIG. 5 is an example diagram 500 of a plan view of a section of a circuit layout including the section 405 of the original route and unused horizontal space (e.g., 505 and 510) that is available for new extension metal sections and/or alternate vias to be added.

Figure 6:
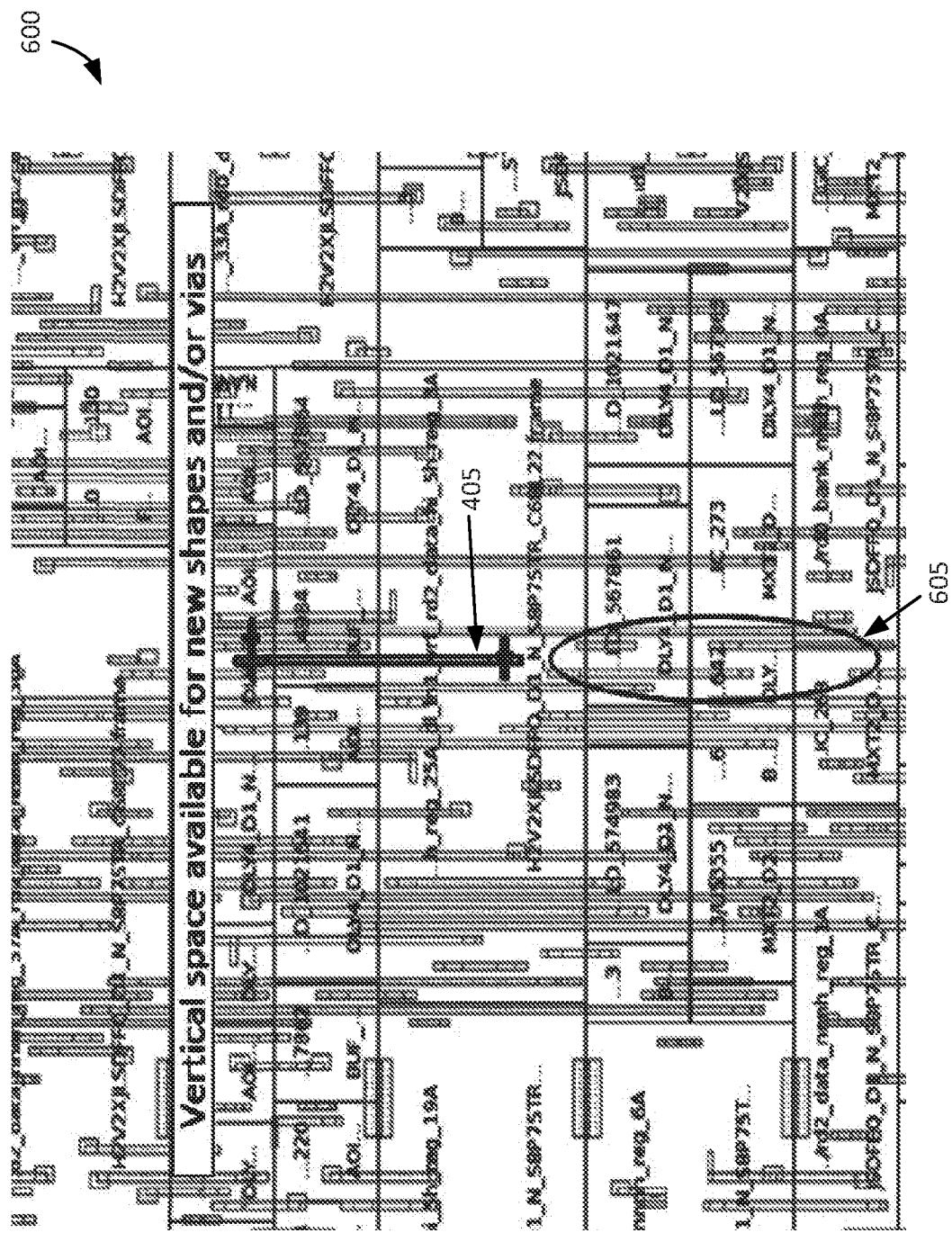
FIG. 6 is an example diagram of a plan view of a section of a circuit layout including the original route and unused vertical space that is available for new extension metal sections and/or alternate vias to be added.

FIG. 6 is an example diagram 600 of a plan view of a section of a circuit layout including the section 405 of the original route and unused vertical space (e.g., 605) that is available for new extension metal sections and/or alternate vias to be added.

Figure 7:
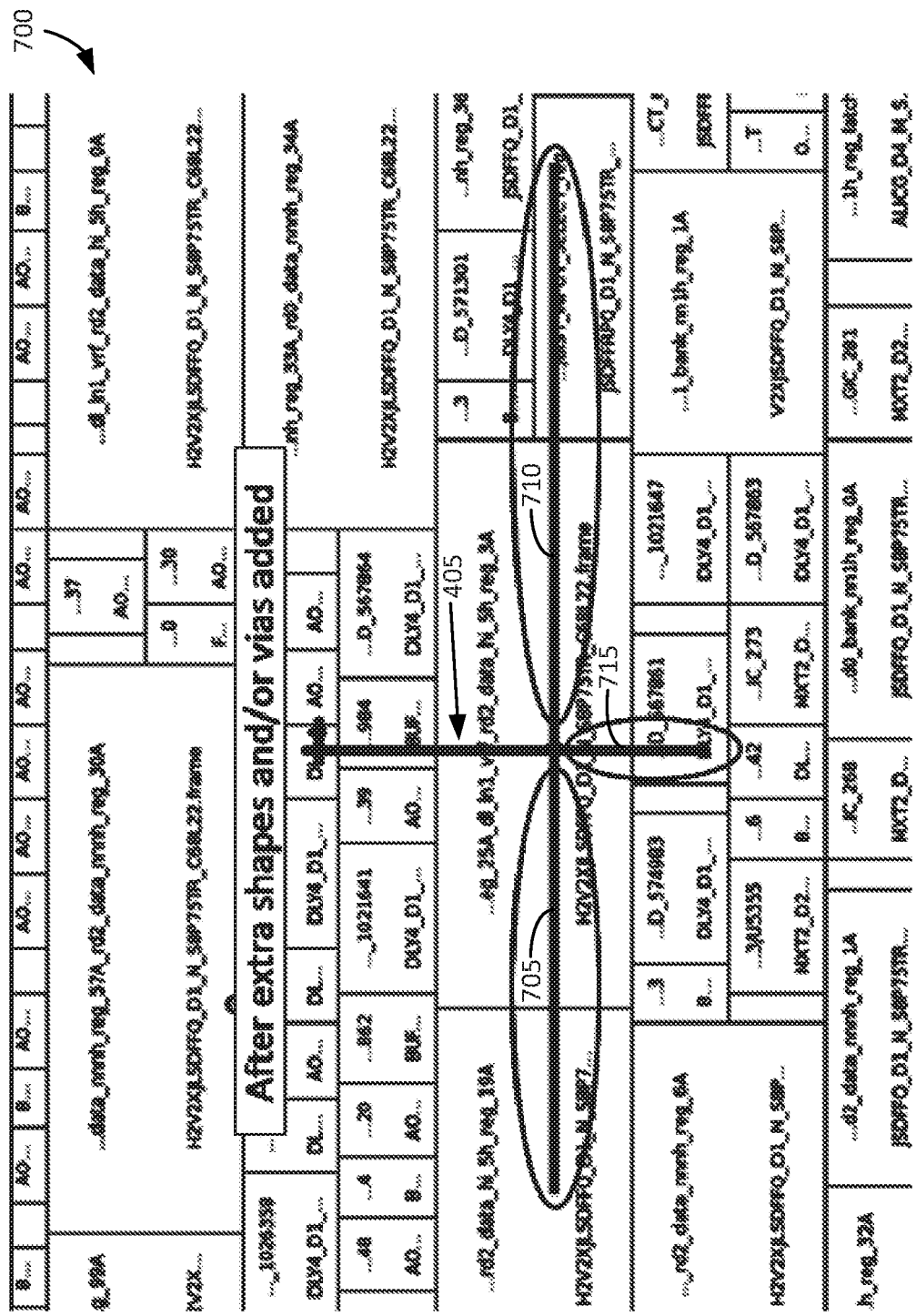
FIG. 7 is an example diagram of a plan view of a section of a circuit layout including the original route and new horizontal and vertical extension metal sections that have been added for purposes of circuit timing fixing in accordance with some embodiments.

FIG. 7 is an example diagram 700 of a plan view of a section of a circuit layout including the original route and new horizontal and vertical extension metal sections (e.g., 705, 710, and 715) that have been added for purposes of circuit timing fixing in accordance with some embodiments.

Figure 8:
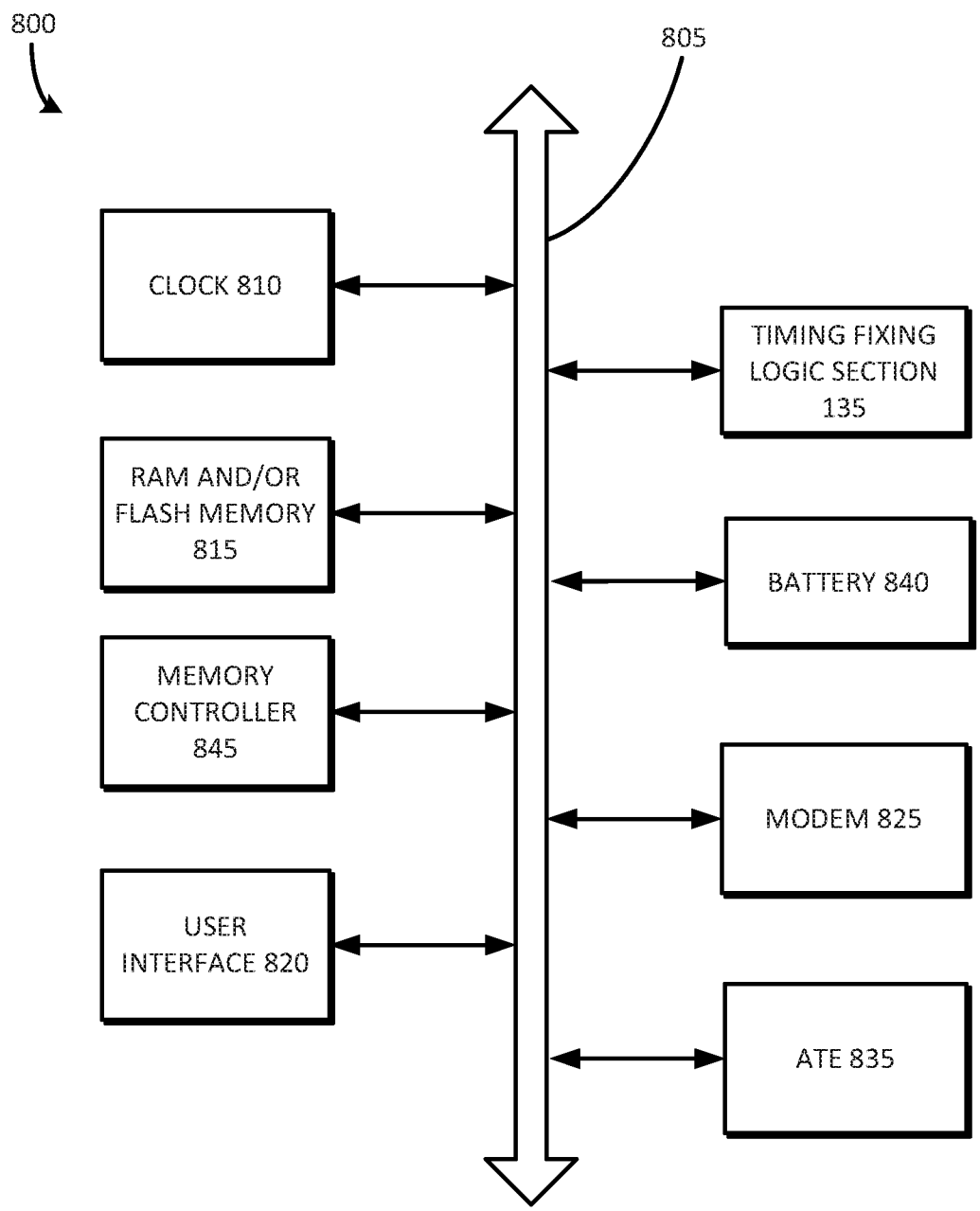
FIG. 8 is an example block diagram of a computing system including a timing fixing logic section according to some embodiments.

FIG. 8 is an example block diagram of a computing system 800 including a timing fixing logic section 135 according to some embodiments. The timing fixing logic section 135 may be electrically connected to a system bus 805. The computing system 800 may also include a clock 810, a random access memory (RAM) and/or flash memory 815, a memory controller 845, a user interface 820, a modem 825 such as a baseband chipset, and/or automated test equipment (ATE) 835, any or all of which may be electrically coupled to the system bus 805.

If the computing system 800 is a mobile device, it may further include a battery 840, which powers the computing system 800. Although not shown in FIG. 8, the computing system 800 may further include an application chipset, a camera image processor (CIS), a mobile DRAM, and the like. The memory controller 845 and the flash memory 815 may constitute a solid state drive/disk (SSD), which uses a nonvolatile memory to store data.

The various operations of methods described above may be performed by any suitable means capable of performing the operations, such as various hardware and/or software component(s) such as logic sections, circuits, and/or module(s).

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A non-transitory machine-readable medium comprising instructions executable by one or more processors, the instructions comprising instructions to:
   receive, by an input logic section, a timing violation report;
   select, by a design rules checking logic section, a timing path from among a plurality of timing paths;
   for the selected timing path, traverse each of a plurality of nets along the path;
   for a particular net from among the plurality of nets, traverse each of a plurality of metal layers;
   for a particular metal layer from among the plurality of metal layers, traverse each of a plurality of shapes that are associated with the particular net;
   examine, by a timing fixing logic section, space that is nearby each of the plurality of shapes;
   identify, by the timing fixing logic section, unused space within the examined space;
   add, by the timing fixing logic section, an extension metal section to at least one of the shapes from among the plurality of shapes;
   identify, by the timing fixing logic section, an existing via of a first type from among a plurality of vias associated with the examined space;
   select, by the timing fixing logic section, an alternate via of a second type having a resistance that is higher than the existing via; and
   replace the existing via with the alternate via.

2. The non-transitory machine-readable medium of claim 1, further comprising instructions to:
   improve hold timing of a circuit dependent on at least one of the extension metal section or the alternate via.

3. The non-transitory machine-readable medium of claim 1, further comprising instructions to:
   improve setup timing of a circuit dependent on at least one of the extension metal section or the alternate via.

4. The non-transitory machine-readable medium of claim 1, further comprising instructions to:
   receive a user-defined value representing a number of nets from among the plurality of nets to be traversed; and
   limit the plurality of nets to be traversed to the user-defined value.

5. The non-transitory machine-readable medium of claim 1, further comprising instructions to:
   track, by the timing fixing logic section, a number of extension metal sections that are added;
   track, by the timing fixing logic section, a number of vias that are replaced; and
   when at least one of the number of extension metal sections or the number of vias exceeds a predefined threshold, output an improved netlist.

6. The non-transitory machine-readable medium of claim 5, further comprising instructions to:
   perform a lookup operation in a lookup table, wherein the lookup table includes resistance information associated with each of the plurality of metal layers.

7. The non-transitory machine-readable medium of claim 6, wherein the lookup table includes capacitance information associated with each of the plurality of metal layers.

8. The non-transitory machine-readable medium of claim 7, wherein the lookup table includes resistance information associated with each of the number of vias.

9. The non-transitory machine-readable medium of claim 8, wherein the lookup table includes driver sizes information.

10. The non-transitory machine-readable medium of claim 9, further comprising instructions to:
    perform the lookup operation in the lookup table to guide addition of the extension metal section.

11. The non-transitory machine-readable medium of claim 9, further comprising instructions to:
    perform the lookup operation in the lookup table to guide the number of extension metal sections that are added.

12. The non-transitory machine-readable medium of claim 9, further comprising instructions to:
    perform the lookup operation in the lookup table to guide the number of vias that are replaced.

13. A non-transitory machine-readable medium comprising instructions executable by one or more processors, the instructions comprising instructions to:
    receive, by an input logic section, a timing violation report;
    select, by a design rules checking logic section, a timing path from among a plurality of timing paths;
    for the selected timing path, traverse each of a plurality of nets along the path;
    for a particular net from among the plurality of nets, traverse each of a plurality of metal layers;
    for a particular metal layer from among the plurality of metal layers, traverse each of a plurality of shapes that are associated with the particular net;
    examine, by a timing fixing logic section, space that is nearby each of the plurality of shapes;
    identify, by the timing fixing logic section, unused space within the examined space; and
    add, by the timing fixing logic section, an extension metal section in the unused space to at least one of the shapes from among the plurality of shapes; identify, by the timing fixing logic section, an existing via of a first type from among a plurality of vias associated with the examined space;

select, by the timing fixing logic section, an alternate via of a second type having a resistance that is higher than the existing via; and replace the existing via with the alternate via.

\* \* \* \* \*